United States Patent [19]

Petterson et al.

[11] Patent Number: 4,497,866
[45] Date of Patent: Feb. 5, 1985

[54] SUCKER ROD

[75] Inventors: De Witt R. Petterson, Dover; John Skelton, Sharon; David S. Brookstein, Needham, all of Mass.

[73] Assignee: Albany International Corp., Menands, N.Y.

[21] Appl. No.: 525,646

[22] Filed: Aug. 23, 1983

Related U.S. Application Data

[63] Continuation-in-part of Ser. No. 297,761, Aug. 31, 1981, abandoned.

[51] Int. Cl.³ .................. B32B 15/00; B25G 3/00; D02G 3/00
[52] U.S. Cl. .................... 428/365; 403/343; 428/367; 428/377; 428/379; 428/392
[58] Field of Search ............. 428/375, 379, 367, 365, 428/377, 392; 87/8, 7, 11; 403/343, 265

[56] References Cited

U.S. PATENT DOCUMENTS

| | | | |
|---|---|---|---|
| 2,262,861 | 11/1941 | Rugeley et al. | 428/365 |
| 3,446,251 | 5/1969 | Dow | 139/383 R |
| 3,457,962 | 7/1969 | Shobert | |
| 3,936,336 | 2/1976 | Phillips | 428/375 X |
| 4,063,838 | 12/1977 | Michael | 428/377 |
| 4,205,926 | 6/1980 | Carlson | 403/343 |
| 4,360,288 | 11/1982 | Rutledge et al. | 403/268 |

Primary Examiner—Lorraine T. Kendell
Attorney, Agent, or Firm—Kane, Dalsimer, Kane, Sullivan & Kurucz

[57] ABSTRACT

A rod assembly comprising a core component and a sheath component and having an elongate cross-section, the sheath component consisting of an anisotropic assembly of non-metallic filamentary elements embedded in a polymeric matrix whereby the bending stiffness for deformations about an axis parallel to the major axis of the rod assembly is less than the bending stiffness of the same core and sheath components in a radially symmetrical configuration, and in which the core and sheath components have load-elongation characteristics so that the ratio of the strain to the strain-to-break in the sheath is essentially equal to the ratio of the strain to the strain-to-break in the core throughout the working load range.

7 Claims, 6 Drawing Figures

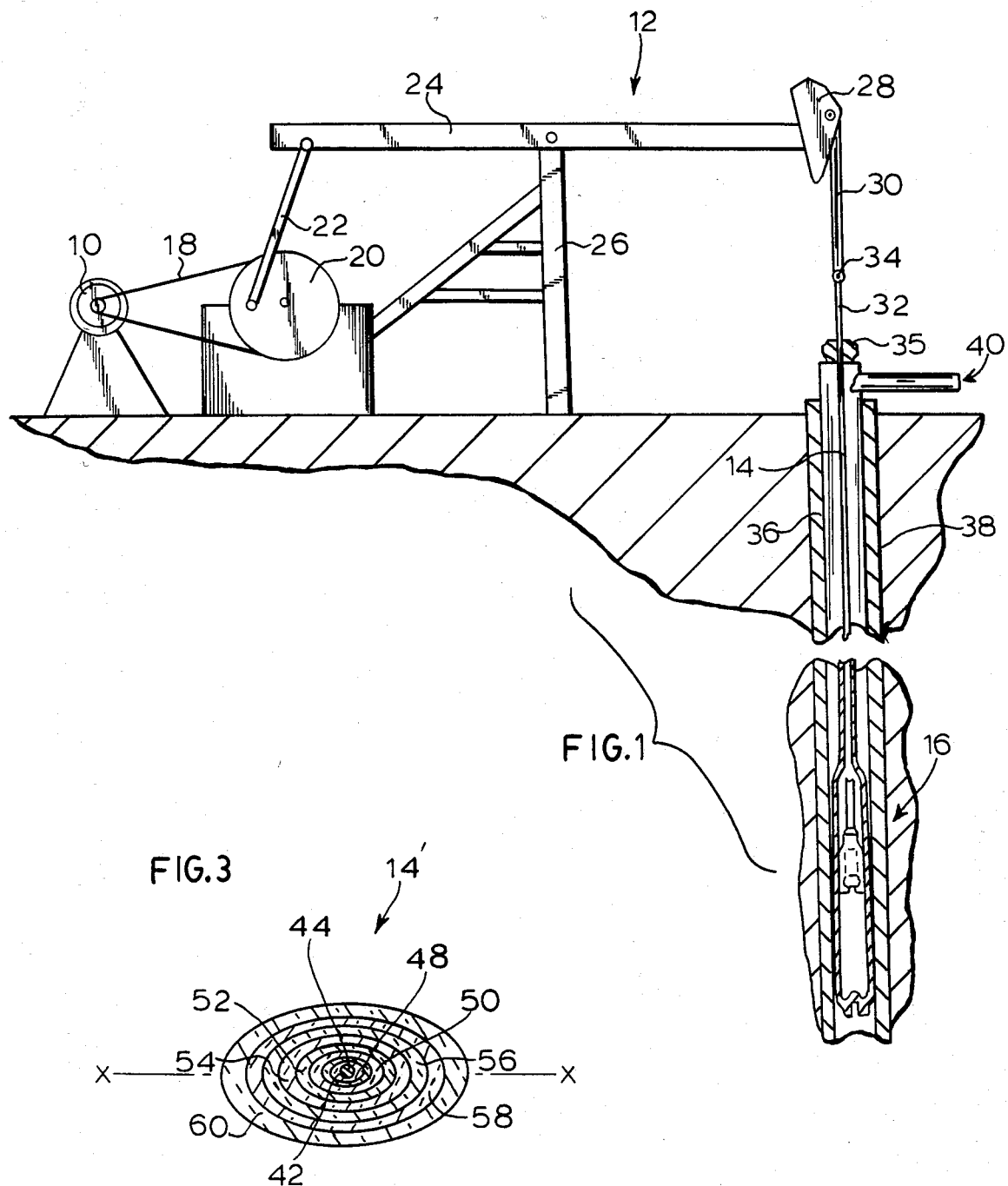

SUCKER ROD

This is a continuation-in-part of application Ser. No. 297,761 filed Aug. 31. 1981 and now abandoned.

BACKGROUND OF THE INVENTION

Conventional beam pumping installation for pumping fluid such as oil from underground locations utilize rods which are coupled in a continuous fashion to connect a surface pumping unit to an underground or subsurface downhole well pump for the purpose of transmitting mechanical energy from the surface equipment to the subsurface pump. The individual rods comprising the string are known as sucker rods and the plurality when coupled is referred to as a sucker rod string.

Subsurface oil well pumps are generally classified as either tubing or rod pumps. In the case of tubing pumps, the barrel is run on the tubing and the plunger is run on the rod string. Rod pumps have the advantage of being more easily removed for servicing and are less susceptible to damage in running but they offer less working area for the plunger since the maximum bore of a rod pump is necessarily less than the maximum bore of a tubing pump for the same size tubing. In either case, however, pump travel length or plunger stroke is highly important in determining output, since the plunger stroke for any given pump when multiplied by the product of stroke rate and plunger area gives the volumetric productivity.

In the prior art publication "Well Design: Drilling and Production", Craft, B. C., Holden, W. R., and Graves, E. P. Jr., Prentice-Hall Inc., 1962 it is taught that the effective plunger stroke downhole differs from the polished rod stroke; it is decreased by the effects of rod stretch resulting from fluid load and rod mass; and is increased by the effect of plunger overtravel. Since the magnitudes of these increases and decreases in stroke length are affected by the mechanical properties of the rods it is evident that the effective stroke downhole can be modified by suitable manipulation of the rod materials and characteristics, and this possibility has lead to considerable development effort in this area. In particular, it is interesting that modern data-logging and computational techniques, such as prescribed in SPE paper 588 by S. G. Gibbs presented at the Rocky Mountain Joint Regional Meeting, May 1963, of the Society of Petroleum Engineers of AIME permit the matching of sucker rod properties and the make-up of the sucker rod string to the operational parameters of a given well to achieve highly favorable pumping conditions, and hence, enhanced operational economics.

Sucker rods are currently manufactured in discrete lengths of either 25 ft. or 37.5 ft. and coupled together in the field. Couplings are expensive and introduce a mechanical weakness in the sucker rod string. References have been made to the use of wire cable without couplings. However, a cable, per se. lacks the appropriate bending rigidity to properly serve the end use.

Early sucker rods were of all-metal construction as exemplified by U.S. Pat. No. 528,168 issued Oct. 30, 1894. Thereafter initial efforts to improve sucker rod performance were concerned with use of materials and design to resist corrosion and stress failure in view of the harsh environment of the well in which the rod is worked. These efforts are illustrated in prior art patents such as: U.S. Pat. No. 3,486,557 issued in 1969 to Harrison, showing a rod comprising an inner cable surrounded by an encasement of molded plastic or fiberglass in an unspecified configuration wherein the end of the encasement has a conical recess to receive a splayed end of the cable which is held therein by metal introduced into the recess while molten and wherein the outer surface of the encasement is threaded to receive a connecting sleeve that serves to transfer load between adjacent sucker rods; U.S. Pat. No. 4,063,838 issued in 1977 to Michael showing a sucker rod having a solid steel core wrapped with resin-impregnated glass filaments in which the filaments form a stratified structure and the load transfer is via the outer surface of the wrapping in a manner similar to that described by Harrison. The information supplied to illustrate the examples in Michael show that the rod described by Michael does not fulfill the load-sharing requirements specified by the present invention. An additional patent to Carlson (U.S. Pat. No. 4,205,926) also describes a wrapped-cable rod; in this latter concept, however, the sheath material contains only helically wrapped filaments and is specifically designed to sustain compressive load in an attempt to maintain the core in a state of tension after the curing step.

It is interesting to note that as early as 1959 U.S. Pat. No. 2,874,937 to Higgins disclosed a sucker rod comprised of glass fibers held together by plastic resin. Intensive work has been undertaken in the field of fiberglass sucker rod design. Fiberglass is not seriously affected by corrosion, possesses a low specific gravity and has a high tensile strength-to-weight ratio compared to steel.

In Paper SPE6851 presented at a technical meeting of SPE of AIME, Denver in October of 1977 Watkins and Haarsma described a continuous process for producing a high-volume-fraction glass rod in which glass filaments are collimated (rendered parallel to a certain line or direction), saturated with resin, ordered into a circular configuration and cured. The current technology appropriate to the manufacture of these rods is described in U.S. Pat. No. 4,360,288 to Rutledge et al. In the current fiber glass rods all of the glass fibers are arranged in a parallel bundle and are then incorporated into a matrix. The glass filaments lie in the longitudinal direction of the rod, and the mechanical behavior of the rod is controlled by the mechanical properties of the glass fibers, which have a tensile strength in strand form of at least 200K psi and a tensile modulus of approximately $10 \times 10^6$ psi. In the transverse direction the bundle is held together by the resin material, which typically has a tensile/compressive strength of 10K psi and a modulus of $0.5 \times 10^6$ psi. Thus the rod has strength and stiffness properties that in the longitudinal direction are approximately 20 times as great as the properties in the transverse direction, and the overall structure possesses a high degree of anisotropy.

The paper presented data on the use of rods produced according to this process. The process has been referred to as the "pultrusion" process and the resulting rods have been referred to as "pultruded" fiberglass/resin composite rods.

Pultruded fiberglass sucker rods have a number of recognized positive attributes which include:

1. Higher Strength/Weight Ratio and Lower Rod Density than Steel Sucker Rods

Lighter weight sucker rods allow the use of smaller pumpjacks and develop lower gear box loadings for a constant rate of production compared with those required for steel rods.

2. Good Corrosion Resistance/Low Electrical Conductivity

Fiberglass/polyester composites have much greater resistance to corrosion than unprotected steel in the hostile environment found downhole. The downhole environment includes crude oil, $H_2S$, $CO_2$ and water at temperatures up to 200° F., and furthermore, enhanced oil recovery techniques often result in increased concentration of corrosive elements. Rod strings consisting entirely of steel have been known to have useful lives of less than three months when employed in corrosive environment wells.

3. Opportunity for Increased Oil Well Productivity

Fiberglass possesses an extensional modulus that is approximately ⅓ that of steel. While fiberglass is considered generally to be a stiff material, when fabricated into sucker rods and subsequently installed in a deep (approx. 3,000 to 8,000 ft.) well, the resulting structure is sufficiently compliant that the reciprocating motion of the rod string is affected to a considerable extent. That is, when the motion of the upper end of the rod string changes direction, the ratio of the inertial forces to the elastic forces is such that the lower end of the rod string tends to continue along the original direction. As a consequence the stroke of the lower end of the rod string can be considerably longer than the stroke at the upper end. This phenomenon, referred to as "overtravel", results in enhanced productivity for a given pump stroke and rate.

4. Relatively simple to Fabricate

Fiberglass can be pultruded along with a variety of resin systems (for example, polyester, vinyl ester or epoxy) on a continuous basis through a constant cross-section die. The pultruded rods are then cut to length and adhesively bonded to metal couplings.

While pultruded fiberglass sucker rods have the aforementioned attributes, they also possess some significant shortcomings.

These include:

1. Coupling bond.

Pultruded fiberglass sucker rods are bonded to the coupling at only one surface, as fully described in U.S. Pat. No. 4,360,288 to Rutledge et al. This single interface between the composite rod body and the metal coupling is somewhat vulnerable and prone to premature failure.

2. Metal Couplings Exposed to Corrosive Environment.

Pultruded fiberglass rods are usually terminated with a steel coupling. This coupling is exposed to the sour environment of the oil well and is subject to corrosion and to the possibility of stress-corrosion failure.

3. Reduced Torsional Properties

The uniaxial character of the fiberglass in the pultruded rod does not provide strength in torsion. While sucker rods are not generally loaded in the torsional mode, torsional loads might be applied to unstick a downhole pump, and if the unsticking torque exceeds the torsional strength of the pultruded rod, it will fail in shear.

This illustrates one of the principal problems that is inevitably associated with too high a degree of anisotropy in a composite material. The fully collimated filaments provide good properties in the longitudinal direction, but if the mechanical properties are too low in the transverse direction, then the mechanical performance in that direction can be so poor as to constitute an overall liability, and it is to the provision of the optimum degree of anisotropy that the present invention is addressed through the appropriate combination of structural elements. It is not sufficient, as in the current rods made up from collimated bundles, to provide load-bearing elements, and associated mechanical properties, in only one direction: it is necessary in addition to provide non-axial load-bearing members which reduce the anisotropy by a sufficient extent to make the transverse properties acceptable while at the same time maintaining as large a fraction as is possible of the desirable axial characteristics.

4. Poor Compression Properties

Compression properties which are critical during sucker rod use include: local axial compression which occurs when the rod rubs against the tubing wall of if the downhole pump sticks; and compression impact if the rods part and the lower portion falls to the bottom of the well. Despite the inherent damping of the motion of this free falling section by the oil in the tubing, compression impact can cause temporary loading which is responsible for both fiber buckling and subsequent "brooming" of the fiberglass. Usually, a pultruded rod is rendered useless when this occurs.

Local compression can also occur when the operator sets the downhole pump to eliminate the condition know as gas pound. In this case, the pump is set to slightly tap the bottom and the local compression that results is small in magnitude, but is continual in nature, and it is reputed to cause premature failure over the long term.

SUMMARY OF THE INVENTION

The desirable attributes of pultruded fiberglass sucker rods can be realized and their shortcomings minimized by the utilization of a unique combination of structural elements which include various polymers, metals and ceramics. Towards this end, the present invention envisions a concentric structural combination of elements, consisting of an elongate core component, and an elongate sheath component which consists of an interlaced configuration of assemblies of non-metallic filamentary elements embedded in a polymer matrix, the load-elongation characteristics of the core and sheath components being chosen so as to ensure that both components share substantially in the load-bearing under the working load conditions, with at least 50% of the load being borne by the aggregate of the non-metallic elements, and the sheath and matrix being disposed so as to substantially cover and protect the core and coupling components.

As an example of an embodiment of this invention, we consider a core component which consists of a steel wire rope covered with a sheath of load bearing fiberglass filaments oriented predominately, but not exclusively, along the longitudinal axis of the wire rope, to provide the appropriate degree of functional anisotropy, impregnated with a polymeric resin and subsequently cured. Both structural elements of the rods, namely the core and the sheath, are involved in the load bearing during use, and the vulnerable metallic core and coupling components are protected from the potentially harmful environment of the well.

In order to achieve improved torsional and compressive properties, we incorporate into the sheath component filamentary elements that are aligned at an oblique angle to the longitudinal axial direction. These elements supply resistance to shear deformation of the assembly, and thus can increase the torsional strength by an appropriate design and also provide, under appropriate loading conditions, an inwardly-directed radial component of force that restricts the radial growth in the rod, and hence restricts or prevents "brooming". In order to produce a sheath structure that is as symmetrical as possible in its response to torsional strains it is helpful if the oblique elements are aligned in both the plus and minus angular directions as measured with respect to the longitudinal axis. In a filament winding process the oblique elements form an interleaved assembly. It is also of considerable value however if the two sets of oblique elements form an interlaced assembly, both with themselves and with such longitudinal elements as may be present. In this way not only is the structural integrity of each layer of the sheath material improved, but it is also possible to achieve the greatest measure of control over the circumferential location of the longitudinal elements.

All the theoretical and practical considerations described above can be realized in the preferred embodiment of this invention, which utilizes a steel wire rope for the core and a triaxially braided fiberglass multilayered sheath, which provides the preferred interlaced configuration of assemblies of structural filaments which involve both longitudinal and oblique elements ordered in such a way as to provide adequate tensile, compressive and shear strength. In particular, the combination of wire rope and fiberglass triaxial braid allows the development of a structure in which the load-elongation and ultimate elongation-to-break characteristics of both components are satisfactorily matched. Both core and sheath components are capable of independent adjustment of their tensile characteristics; the properties of the wire rope can be manipulated by choice of construction and by the use of transversely compliant core material; the properties of the braided sheath can be manipulated, inter alia, by the choice of non-metallic filamentary material, by alteration of the ratio of amount of longitudinal to oblique material in the system, by alteration of the angle of obliquity, and the overall density of the sheath assembly.

The large number of design options permitted by this particular combination of core and sheath components provides considerable design flexibility, and permits the realization of specific overall design parameters within the framework of a practically viable manufacturing technique. For example, while the embodiment described above uses a steel cable as the core and fiberglass as the outer sheath, in order to exploit to the fullest extent the material/process interaction in this particular end-use application, it is possible that other end-use specifications could be more readily met by the use of alternative materials. These might include for the core tow or rod made from glass, carbon or other ceramic filaments, or from any of the available high strength organic filamentary materials, and for the sheath any of these or similar non-metallic materials. Geometric compatibility can be achieved by utilization of a wire rope with a transversally compliant core. Such a core enhances the elongation to break of the wire rope to the point where it is similar to that of the fiberglass overbraid.

In this invention the cross section of the hybrid tension member is modified in order to reduce the strains associated with bending deformations about a particular axis. This would allow for longer sections of rod which could also be coiled for shipment and storage. In this concept of the invention a circular wire or other core material is surrounded with a braid or wrapping in which the axially oriented fiberglass yarns are placed predominately between the parallel planes tangent to the opposite ends of a diameter of the core with a minimum of them extending beyond the diameter of the core that is perpendicular to these planes. The end result, after appropriate control of the axial yarns during formation, is an elongated cross section which may, for example, be rectangular or elliptical and which will have a lower bending stiffness for bending deformations about an axis parallel to the major axis of the cross section. If the sheet material is braid the interlacings of the braid permit specific positioning of the load carrying yarns relative to the core.

BRIEF DESCRIPTION OF THE DRAWINGS

FIG. 1 is an elevation of a typical conventional beam pumping unit of the type used for pumping oil from a subsurface well and with which the present invention can be used;

FIG. 3 is a cross-sectional view taken along the line 3—3 in the direction of the arrows in FIG. 2 showing the various concentric layers which combine to form the sucker rod shown in FIG. 2;

DESCRIPTION OF THE PREFERRED EMBODIMENT

Figure 5:
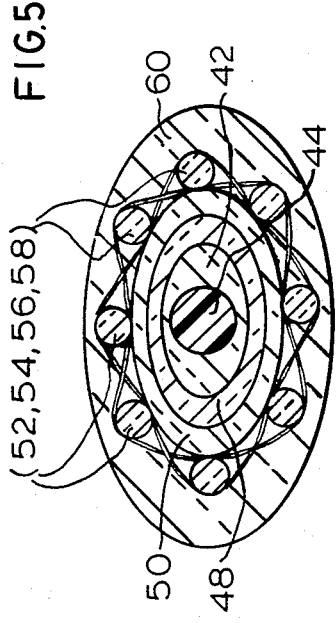
FIG. 5 is a diagrammatic view somewhat similar to FIG. 3 but somewhat more detailed.
Figure 2:
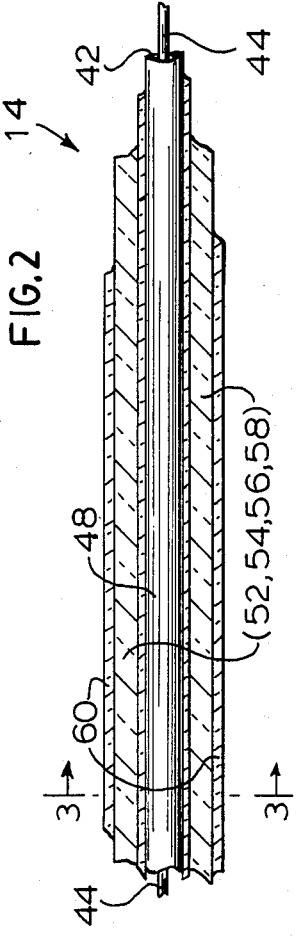
FIG. 2 is a longitudinal sectional segmentary view of a sucker rod constructed in accordance with the teachings of this invention.
Figure 6:
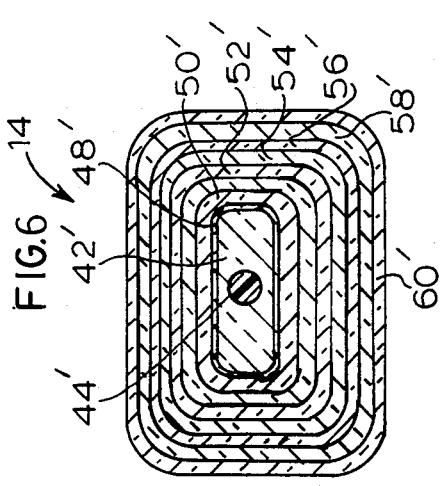
FIG. 6 is a view similar to FIG. 3 but of an alternate embodiment of the invention.
Figure 4:
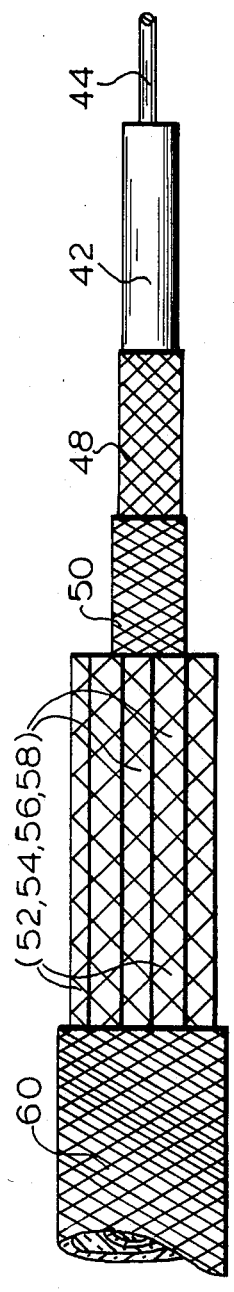
FIG. 4 is an enlarged segmentary longitudinal view somewhat similar to the view if FIG. 2 but with portions of the layers removed to illustrate the internal construction of the rod.

A conventional beam pumping system of the type used for pumping oil from a well and with which the present invention is used is shown in FIG. 1. The unit includes prime mover 10, surface pumping unit 12, sucker rod string 14 with sucker rods constructed in accordance with the teachings of this invention, and subsurface or downhole pump 16.

The function of the prime mover 10 is to supply to the installation mechanical energy which is eventually transmitted to the pump 16 and used to lift fluid. The prime mover selected for a given installation must have sufficient power output to lift fluid at the desired rate from the working fluid level in the well. Further, the load on the prime mover is a function of the weight of the sucker rod string 14. While pumping units are counterbalanced, the weight of the sucker rod affects not only the prime mover but the size of the pumping unit and required mechanical energy transmission components. And, of course, the load on the prime mover determines the energy requirement for pumping.

The subsurface pump 16 is provided to admit fluid from the formation in the well and to lift the fluid thus admitted to the surface.

The surface pumping unit indicated generally by the numeral 12 in the Figs. transfers energy for pumping the well 16 from the prime mover 10 to the sucker rod string 14. In doing this, it must change the rotary motion of the prime mover to reciprocating motion for the sucker rods, and it must reduce the speed of the prime mover to a rate suitable for pumping.

The surface pumping unit components shown in FIG. 1, in addition to the prime mover 10, include V-belt drive 18, crank arm 20. pitman arm 22, walking beam 24 pivotally connected to sampson post 26, horses head 28, and hanger cable 30. Polished rod 32 is connected to the hanger cable by clamp 34. Rod 32 is projected within stuffing box 35 and the sucker rod string is connected thereto.

Sucker rod string 14 is suspended within tubing 36 which itself is projected within the hole by casing 38. Flow-line 40 is indicated as being connected to tubing 36.

The sucker rod of this invention is shown in detail in the Figs.

The rod includes a concentric combination of steel wire helically stranded rope 42 containing a transversally compliant polymer core 44 and a triaxially braided fiberglass reinforced resin elongate sheath which is corrosion resistant and possesses a high strength-to-weight ratio. It is comprised of a plurality of concentric anisotropic layers such as, for example those designated in the Figs. by the numerals 48, 50, 52, 54, 56, 58, and 60.

Wire rope 42 ($\frac{3}{8}$" fiber core) is a stranded structure of low tensile modulus which is comparable to that of fiberglass and is of high tensile strength. The transversely compliant polymer core increases the strain-to-break property of the wire rope so that it is in the immediate range of the strain-to-break property of the longitudinally ordered fiberglass structural elements.

The resulting combination of structural elements provides a tensile structure wherein each component bears axial loading at similar ratios of the ultimate load and strain-to-break in a structurally efficient manner.

The utilization of braiding allows opportunity for pump overtravel for many configurations with high strength-to-weight ratios. The braided sheath increases the torsional strength and provides "off-axis" reinforcement and improves the compressive properties of the combination.

In the example given braid layer 48 is a triaxial braid with cross yarns at 45° to the rod axis. There are thirty-two yarns with sixteen having a right hand obliquity and sixteen having left hand obliquity (16×16). Each yarn possesses a linear density specified by a yield of 2500 yds/lb. There are eight longitudinal yarns interlaced with the oblique yarns having a linear density specified by a yield of 112 yds/lb.

Layers 50, 52, 54, 56 and 58 are all the same with a construction somewhat like that of layer 48, that is, 16×16 cross yarns at 45° to the rod axis and having a linear density specified by a yield of 2500 yds/lb. There are 8 longitudinal yarns interlaced with the cross yarns. The linear density of these yarns is specified by a yield of 56 yds/lb. It has been found undesirable to use lengthwise yarns with this high linear density in layer 48 since there is not sufficient room to accommodate the cross sectional area of these yarns in a single, compact layer. FIG. 5 illustrates the lengthwise yarns held in position in the triaxial braid portion of the sheath which insures the integrity of the structure.

The final layer 60 is a 48×48 braid of conventional construction utilizing yarns specified by a yield of 2500 lbs/yd. The layer contributes to the torsional strength and provides a smooth outer surface to the rod assemblies.

During braiding, a resin system is applied to the rod structure to impregnate the fiberglass. The number of layers of fiberglass yarns which are braided, the ratio of linear densities of axial yarn to cross yarns, and the braid angle can be adjusted over a wide range to affect total system modulus and hence plunger overtravel. Further, this is accomplished while maintaining the sucker rod strength within a range suitable for oil well pumping. The steel wire rope and the oblique sets of ply fiberglass yarns contribute to the torsional strength of the rod. Also it may be desirable in certain applications to include a filamentary component in the external layer of the sheath which by its nature and disposition will mechanically protect the interior load bearing elements.

The unique feature of this invention is that the composite rod 14 is so formed as to have in cross section a major axis such as X—X as shown in FIG. 3 to provide a bending stiffness about an axis parallel to axis X—X which is lower than for a structure made from the same components arranged in a radially symmetrical configuration. This will allow for coiling of the rod and the elimination in many instances of the use of couplings. By way of example the cross section in the preferred embodiment is elliptical as seen in FIG. 3.

A further embodiment of the invention is shown in FIG. 5 wherein components similar to the components shown in FIG. 3 are indicated by the same numeral but provided in each instance with a "prime". The embodiment shown in FIG. 5 is identical in all respects to that shown in FIG. 3 except that the cross section configuration is rectangular, with rounded corners.

We claim:

1. A rod assembly comprising in combination a core component and a sheath component and having an elongate cross section, said sheath component consisting of an anisotropic interlaced assembly of non-metallic filamentary elements embedded in a polymeric matrix whereby the bending stiffness for deformations about an axis parallel to the major axis of the elongate cross section is less than the bending stiffness of the same core and sheath components in a radially symmetrical configuration, and in which said core and sheath components have load-elongation characteristics so that the ratio of the strain to the strain to break in the sheath is essentially equal to the ratio of the strain to the strain to break in the core throughout the working load range.

2. A rod assembly in accordance with claim 1 in which said non-metallic filamentary elements form a braided structure.

3. A rod assembly in accordance with claim 1 or 2 in which said non-metallic filamentary elements form a triaxially braided structure.

4. A rod assembly in accordance with claim 1, 2 or 3 in which said filamentary elements are fiberglass and said core component is a stranded cable of low tensile modulus and high tensile strength.

5. A rod assembly in accordance with claim 4 in which said core component comprises a transversally compliant center core whereby the extension-to-break characteristic of the core component is increased.

6. An assembly as defined in claim 1 wherein said sheath component has an external layer comprising a protective filamentary element.

7. A rod assembly in accordance with claim 1 in which said sheath component consists of a first set of yarns thereof extending in the direction of said core component and a second set of yarns thereof enveloping said core component at angles to said first set of yarns.

* * * * *